United States Patent Office 3,116,296
Patented Dec. 31, 1963

3,116,296
BIS(PYRIDYL-METHYL)DISULFIDES
Rudolf Hotovy, Darmstadt, and Gustav Schorre, Darmstadt-Eberstadt, Germany, assignors to E. Merck Aktiengesellschaft, Darmstadt, Germany, a corporation of Germany
No Drawing. Filed Feb. 15, 1962, Ser. No. 173,326
Claims priority, application Germany Feb. 24, 1961
8 Claims. (Cl. 260—294.8)

This invention relates to organic disulfides. More particularly, it is directed to new organic disulfides having the following Formula I:

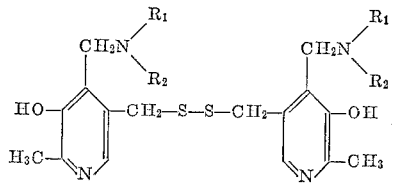

Formula I wherein $R_1$ and $R_2$ designate hydrogen or an alkyl radical having from 1 to 4 carbon atoms, as well as their acid addition salts.

It has been found that these novel compounds possess valuable pharmacological properties.

Accordingly, it is among the objects of this invention to provide the aforesaid novel compounds of Formula I (which includes their acid addition salts); and methods of producing the same.

The aforesaid novel substances may be produced by a variety of syntheses, as for example:

(a) By reaction of a compound of Formula II

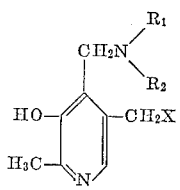

Formula II wherein $R_1$ and $R_2$ have the significance above defined; and X designates a halogen or the acid addition salts thereof with a water-soluble inorganic disulfide, or (b) By treating a compound of Formula III

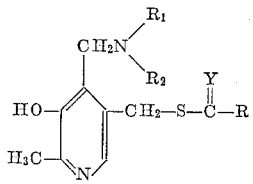

Formula III wherein $R_1$ and $R_2$ have the significance above defined; Y designates oxygen or sulfur; and R designates an alkyl or alkoxy radical having not more than 5 carbon atoms or $NH_2$ with an alkaline agent or (c) By oxidation of a compound of Formula IV

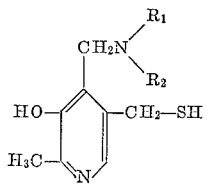

Formula IV wherein $R_1$ and $R_2$ have the significance above defined to form the corresponding disulfide.

In accordance with the invention, the compounds of Formula I can furthermore be converted by known methods into the corresponding acid addition salts.

Method (a).—The reaction of a compound of Formula II with an inorganic water-soluble disulfide is advisedly carried out in the presence of water and a water-miscible organic solvent. As a water-soluble inorganic disulfide, an alkali metal disulfide enters particularly into consideration. The use of sodium disulfide is particularly advantageous. Suitable water-miscible organic solvents are, for example, lower aliphatic alcohols, such as methanol, ethanol, isopropanol, etc., or acetone, dioxane, tetrahydrofuran, dimethyl formamide, glycol, etc. Methanol is particularly suitable, especially for economic reasons. The water and the water-miscible organic solvent are preferably used in a ratio of 2:1. For purification, the disulfide of Formula I which is contaminated with elemental sulfur is filtered off from the reaction mixture. Thereupon the precipitate is dissolved in a dilute acid, for instance, in 2 N hydrochloric acid, and the sulfur, which does not pass into solution, is filtered off. The hydrochloride of the corresponding disulfide of Formula I can be obtained in crystalline form from the filtrate by concentration.

Method (b).—The compounds of Formula III which, upon treatment with an alkaline agent, give the disulfides of Formula I can be prepared, for instance, from the corresponding 3-halomethyl compounds of Formula II. Thus, for instance, by reacting a compound of Formula II with an alkali metal salt of a thiocarboxylic acid having at most 5 C-atoms, there are obtained the corresponding 3-acylthiomethyl derivatives. An alkali thioacetate ($Y=O$, $R=$alkyl in Formula III) is preferably used. Compounds of Formula III in which $Y=S$ and $R=$alkoxy can be obtained by reacting a 3-halo-methyl compound of Formula II with an alkali xanthate ($C_2H_5$—O—CS—S-alkali metal). Furthermore, by treating a compound of Formula II with ammonium dithiocarbamate, there is obtained a compound of Formula III, in which $Y=S$ and $R$—$NH_2$, which can easily be converted into the active disulfides of Formula I. The compound III produced from the 3-halo-methyl compound of Formula II and ammonium dithiocarbamate is preferably not isolated since it passes readily, upon standing in alkaline solution, into the corresponding disulfide of Formula I. The reaction is most simply carried out by allowing the reaction product to stand for some time in an organic solvent, preferably alcohol and also in the presence of ammonia.

The 3-methyl xanthates and the 3-acylthiomethyl compounds of Formula III can also be converted in a smooth, simple reaction into the organic disulfides of Formula I by treatment with alkaline agents. Suitable alkaline agents are, for instance, alkali metal or alkali-earth metal hydroxides, and particularly $NH_3$. The reaction can be carried out in aqueous solution or possibly in the presence of an inert organic solvent, such as a lower alcohol. The reaction may suitably be carried out at room temperature.

Method (c).—The oxidation of a compound of Formula IV to form the corresponding disulfide of Formula I can be effected with all suitable oxidizing agents, for instance, with hydrogen peroxide, air, oxygen or iodine. The oxidation can be effected both in aqueous solution and in an inert organic solvent, for instance, in a lower alcohol, in dioxane or acetone. In many cases, it is advantageous to use the 3-mercaptomethyl compound of Formula IV as crude product for the oxidation without previously isolating it from the reaction mixture obtained upon its preparation. The oxidation takes place even at room temperature; of course, the oxidation mixture can also be heated.

In order to form acid addition salts, there enter into consideration particularly strong acids which give physiologically tolerated salts. Thus, for instance, hydrochloric acid, hydrobromic acid, aminosulfonic acid, methane sulfonic acid, sulfuric acid, phosphoric acid, as well as citric, succinic, maleic and fumaric acid are suitable.

The compounds of Formula II which are to be used as starting material can be prepared from pyridoxamine; the latter can be converted, for instance, by means of concentrated hydrobromic acid, into 3-bromomethyl-4-amino - methyl - 5 - hydroxy - 6 - methyl - pyridine - dihydrobromide. Instead of pyridoxamine, there can also be used in accordance with the invention the derivatives of pyridoxamine which are substituted on the amine group and which may be prepared by reacting pyridoxal with a primary amine, followed by hydrogenation. In this way, there are obtained the monoalkylated compounds of Formula II which can possibly be converted by alkylation into the corresponding dialkylated pyridoxamine derivatives. The compounds of Formula III can be prepared from the 3-halomethyl-4-aminomethyl-5-hydroxy-6-methyl-pyridine compounds of Formula II by reaction with the corresponding S-containing compounds, such as, for instance, potassium thioacetate, alkali xanthate or ammonium dithiocarbamate. Upon the reaction of the 3-halomethyl compounds of Formula II with, for instance, potassium thioacetate, there are obtained, upon subsequent saponification with, for instance, hydrochloric acid, the compounds of Formula IV, which are to be used as starting material.

The new compounds are characterized in pharmacological tests on rabbits by a very strong central-analgesic action, similar to that of morphine. One particular advantage of the new compounds is their extremely good compatibility. Some of the compounds are about 10 times less toxic per os than morphine sulfate. A detailed report on the pharmacological properties of pyridoxaminyldisulfide, in particular, is given in "Arzneimittelforschung (Drug Research)," volume 11, pages 922 to 929 (1961).

The new disulfides of Formula I can be worked, possibly with the addition of suitable adjuvants, into all pharmaceutical forms of administration, such as tablets, pills, suppositories, injection solutions or suspensions, etc. They are intended for use as analgesics in human medicine.

The following are examples in accordance with this invention:

*Example 1*

(a) To a solution of 2.8 grams of potassium xanthate in 15 ml. of water, there is added, drop by drop, a solution of 2.3 grams of 3-bromomethyl-4-aminomethyl-5-hydroxy-6-methyl-pyridine-dihydrobromide in 10 ml. of water. The precipitate which deposits is removed by suction filtration, washed with water, and treated with alcoholic hydrochloric acid. After recrystallization from alcohol/ether, the S-(4-aminomethyl-5-hydroxy-6-methyl-pyridyl - 3 - methyl) - xanthate - dihydrobromide melts at >230° C.

(b) 17 grams of S-(4-aminomethyl-5-hydroxy-6-methyl-pyridyl-3-methyl)-xanthate are set aside for 4 days at room temperature in 400 ml. of alcohol and 200 ml. of concentrated ammonia. Thereupon, the reaction mixture is concentrated under reduced pressure. The pyridoxaminyl-disulfide which precipitates (M.P. 140–141° C.) is removed by suction filtration and converted by means of alcoholic hydrochloric acid into the tetrahydrochloride. M.P. 233–235° C. (decomposition) (alcohol/ether).

*Example 2*

(a) 23 grams of potassium thioacetate and 39 grams of 3 - bromomethyl - 4 - aminomethyl-5-hydroxy-6-methyl-pyridine-dihydrobromide are boiled under reflux for 3 hours in 120 ml. of absolute alcohol. The reaction mixture is filtered in the hot. After cooling, 3-acetyl-thiomethyl - 4 - aminomethyl - 5 - hydroxy - 6 - methyl - pyridine-hydrobromide crystallizes from the filtrate and is then recrystallized from alcohol. M.P. 194–195° C.

(b) 40 grams of 3-acetylthiomethyl-4-aminomethyl-5-hydroxy-6-methyl-pyridine-hydrobromide are boiled for 1½ hours in 400 ml. of aqueous hydrochloric acid (12%). The solution is concentrated to 80 to 100 ml. under reduced pressure and alcoholic iodine solution added until a brown color is obtained. The pH of the solution is adjusted to 7. The pyridoxaminyl-disulfide which thereby precipitates out is removed by suction filtration. M.P. 140° C. By treatment with alcoholic hydrochloric acid, the tetrahydrochloride is obtained, which is recrystallized from alcohol/ether. M.P. 234–235° C. (decomposition).

*Example 3*

7.8 grams of 3-bromomethyl-4-aminomethyl-5-hydroxy-6-methyl-pyridine dihydrobromide are dissolved in 80 cc. of absolute alcohol and boiled under reflux for 2 hours with 3 grams of sodium disulfide. The reaction mixture is concentrated, and treated with water, whereupon the pyridoxaminyl-disulfide which is precipitated out is removed by suction filtration and treated with alcoholic HCl. M.P. 233–235° C. (alcohol/ether).

*Example 4*

10 grams of 3-acetylthiomethyl-4-aminomethyl-5-hydroxy-6-methyl-pyridine hydrobromide are boiled for 1½ hours with 120 cc. of 12% aqueous hydrochloric acid. Thereupon the solution is adjusted with dilute aqueous ammonia with ice cooling to a pH of 8 to 8.5. Air is conducted through the reaction mixture until a sample no longer gives a color reaction with sodium nitroprusside. The precipitated pyridoxaminyl-disulfide is removed by suction filtration and converted by means of alcoholic HCl into the hydrochloride. M.P. 233–235° C.

*Example 5*

In a manner similar to Example 2(b), one obtains from 3 - acetylthiomethyl - 4 - diethylamino-methyl-5-hydroxy-6-methyl-pyridine-hydrobromide, the bis-[4-diethylamino - methyl - 5 - hydroxy - 6 - methyl - pyridyl - (3)-methyl]-disulfide. M.P. 85° C. (isopropyl-ether).

In the same manner, bis-[4-butylaminomethyl-5-hydroxy-6-methyl-pyridyl-(3)-methyl]-disulfide is prepared from 3-acetylthiomethyl-4-butylaminomethyl-5-hydroxy-6-methyl-pyridine.

*Example 6*

The bis-[4-dimethylaminomethyl-5-hydroxy-6-methyl-pyridyl-(3)-methyl]-disulfide is prepared by method of Example 2(b) from 3-acetylthiomethyl-4-dimethylaminomethyl-5-hydroxy-6-methyl-pyridine.

*Example 7*

The bis - [4 - monomethylaminomethyl - 5 - hydroxy-6-methyl-pyridyl-(3)-methyl]-disulfide is prepared by the method of Example 2(b) from 3-acetylthiomethyl-4-monomethylaminomethyl-5-hydroxy-6-methyl-pyridine.

*Example 8*

The bis - [4 - dibutylaminomethyl-5-hydroxy-6-methyl-pyridyl-(3)-methyl]-disulfide is prepared by the method of Example 2(b) from the 3-acetylthiomethyl-4-dibutyl-aminomethyl-5-hydroxy-6-methyl-pyridine.

It will be understood that the foregoing description of the invention and the examples set forth are merely illustrative of the principles thereof. Accordingly, the appended claims are to be construed as defining the invention within the spirit and scope thereof.

We claim:
1. A compound of the group consisting of those having the following Formula I:

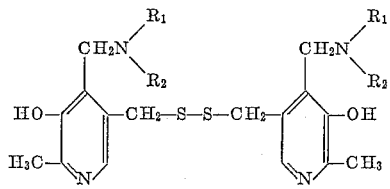

and the pharmaceutically acceptable acid addition salts thereof wherein $R_1$ and $R_2$ are radicals selected from the group consisting of hydrogen and alkyl of 1 to 4 carbon atoms.
2. The bis-[4-aminomethyl-5-hydroxy-6-methyl-pyridyl-(3)-methyl]-disulfide.
3. The bis-[4-diethylamino-methyl-5-hydroxy-6-methyl-pyridyl-(3)-methyl]-disulfide.
4. The bis-[4-butyl-aminomethyl-5-hydroxy-6-methyl-pyridyl-(3)-methyl]-disulfide.
5. The bis-[4-dimethylaminomethyl-5-hydroxy-6-methyl-pyridyl-(3)-methyl]-disulfide.
6. The bis-[4-monomethyl-aminomethyl-5-hydroxy-6-methyl-pyridyl-(3)-methyl]-disulfide.
7. The bis-[4-dibutylaminomethyl-5-hydroxy-6-methyl-pyridyl-(3)-methyl]-disulfide.
8. The tetrahydrochloride of the compound of claim 2.

References Cited in the file of this patent

UNITED STATES PATENTS

| 2,519,470 | Hoffman | Aug. 22, 1950 |
| 3,010,966 | Zima et al. | Nov. 28, 1961 |

FOREIGN PATENTS

| 59,163 | Denmark | Nov. 3, 1941 |